United States Patent
Bahel et al.

(10) Patent No.: US 7,503,182 B2
(45) Date of Patent: Mar. 17, 2009

(54) CONDENSING UNIT CONFIGURATION SYSTEM

(75) Inventors: Vijay Bahel, Sidney, OH (US); Thomas E Crone, Tipp City, OH (US); Altaf Hossain, Fairborn, OH (US); Deborah L Monnin, Minster, OH (US); Marti Atwell-Mays, Tipp City, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 563 days.

(21) Appl. No.: 11/150,594

(22) Filed: Jun. 10, 2005

(65) Prior Publication Data

US 2006/0009880 A1 Jan. 12, 2006

Related U.S. Application Data

(60) Provisional application No. 60/578,887, filed on Jun. 11, 2004.

(51) Int. Cl.
*F25B 49/00* (2006.01)
*B60H 1/00* (2006.01)
*G06G 7/48* (2006.01)

(52) U.S. Cl. .................. 62/127; 62/298; 165/11.1; 700/276; 703/7

(58) Field of Classification Search .......... 62/126, 62/127, 298; 165/11.1; 700/276, 300; 703/7, 703/9
See application file for complete search history.

(56) References Cited

U.S. PATENT DOCUMENTS

| 4,992,940 A | * | 2/1991 | Dworkin ................. 705/26 |
| 6,002,854 A | | 12/1999 | Lynch et al. |
| 6,836,766 B1 | | 12/2004 | Gilpin et al. |
| 7,003,477 B2 | | 2/2006 | Zarrow |

FOREIGN PATENT DOCUMENTS

JP H9-257319 10/1997

OTHER PUBLICATIONS

Porkhial et al.; Transient characteristic of reciprocating compressors in household refrigerators; Applied Thermal Engineering 22 (2002) 1391-1402.

Vanwelkenhuysen; The tender support system; Knowledge-Based Systems 11 (1998) 363-372.

* cited by examiner

*Primary Examiner*—Marc E Norman
(74) *Attorney, Agent, or Firm*—Harness, Dickey & Pierce, P.L.C.

(57) ABSTRACT

A system and method of computer-based configuration of a condensing unit for a cooling system is provided. A list of condensing units is generated based on a selected starting path. A condensing unit is selected from the list of condensing units and reconfigured based on desired criteria. The starting paths include a change an existing product path, a search by own specification path, and a cross competitive product path.

27 Claims, 20 Drawing Sheets

| No. | Condensing Unit | Refrigerant | Nominal HP | Temperature Range | Availability |
|---|---|---|---|---|---|
| 1 | C3AH-0100 | R-22 | 1 | High | Std. OEM |
| 2 | C3AH-0150 | R-22 | 1-1/2 | High | Custom OEM |
| 3 | C3AH-0150 | R-22 | 1-1/2 | High | Std. OEM |
| 4 | C3AH-0203 | R-22 | 2 | High | Custom OEM |
| 5 | C3AH-0203 | R-22 | 2 | High | Std. OEM |
| 6 | C3AH-0204 | R-22 | 2 | High | Std. Wholesaler |
| 7 | C3AM-0100 | R-22 | 1 | Medium | Custom OEM |
| 8 | C3AM-0100 | R-22 | 1 | Medium | Std. OEM |
| 9 | C3AM-0101 | R-22 | 1 | Medium | Std. Wholesaler |
| 10 | C3AM-0202 | R-22 | 2 | Medium | Custom OEM |
| 11 | C3AM-0202 | R-22 | 2 | Medium | Std. OEM |
| 12 | C3AM-0203 | R-22 | 2 | Medium | Custom OEM |
| 13 | C3AM-0203 | R-22 | 2 | Medium | Std. OEM |
| 14 | C7AB-0100 | R-12 | 1 | High/Medium | Std. Wholesaler |
| 15 | C7AB-0150 | R-12 | 1-1/2 | High/Medium | Std. Wholesaler |
| 16 | C7AB-0200 | R-12 | 2 | High/Medium | Std. Wholesaler |
| 17 | CBAM-0103 | R-12 | 1 | Medium | Std. Wholesaler |
| 18 | CBAM-0153 | R-12 | 1-1/2 | Medium | Std. Wholesaler |
| 19 | D2AH-0100 | R-22 | 1 | High | Custom OEM |
| 20 | D2AH-0150 | R-22 | 1-1/2 | High | Custom OEM |

Total 61 Models Found ! To view detail list select a Model from the list.

CONDENSING UNIT CONFIGURATION SYSTEM

CROSS-REFERENCE TO RELATED APPLICATIONS

This application claims the benefit of U.S. Provisional Application No. 60/578,887, filed on Jun. 11, 2004. The disclosure of the above application is incorporated herein by reference.

FIELD OF THE INVENTION

The present invention relates to configuring a condensing unit for an air-conditioning or refrigeration system.

BACKGROUND OF THE INVENTION

Traditional cooling systems, such as refrigeration and air-conditioning systems, include a compressor, a condensing unit, an expansion valve and an evaporator. The compressor compresses gaseous refrigerant exiting the evaporator and discharges the high pressure refrigerant to the condensing unit. The condensing unit operates as a heat exchanger enabling heat transfer from the gaseous refrigerant to a heat sink (e.g., air or water). The refrigerant condenses within the condensing unit and a state change occurs from gas to liquid. The liquid refrigerant exits the condensing unit and flows to the evaporator through the expansion valve. The evaporator also operates as a heat exchanger enabling heat transfer from the atmosphere surrounding the evaporator to the liquid refrigerant. As the heat transfer occurs, the temperature of the refrigerant increases until a state change occurs from liquid to gas. The gas refrigerant is drawn into the suction side of the compressor and the cooling cycle continues.

The condensing unit can be one of an air-cooled condensing unit (ACU) or a water-cooled condensing unit (WCU). An ACU typically includes a fin-tube refrigerant-to-air heat exchanger, an air flow device such as a fan motor and fan blade and associated controls (not shown). In the case of an ACU, air provides the heat sink enabling heat transfer from the condensing unit. A WCU typically includes a refrigerant-to-water heat exchanger and associated controls (not shown). In the case of a WCU, water provides the heat sink enabling heat transfer from the condensing unit.

The particular configuration of the condensing unit depends on various system parameters including the compressor, refrigerant type, operating temperatures and the like. As a result, a repetitive design process is required to provide an appropriate condensing unit for a given cooling system.

SUMMARY OF THE INVENTION

The present invention provides a system and method of computer-based configuration of a condensing unit for a cooling system. A list of condensing units is generated based on a selected starting path. A condensing unit is selected from the list of condensing units and re-configured based on desired criteria.

In one feature, available options along the starting path are limited based on a user identity.

In other features, the plurality of starting paths include a change an existing product (CEP) path, a search by own specification (SOS) path and a cross competitive product (CCP) path. The list of condensing units is generated based on a history of purchased condensing units using the CEM path. The history is defined over a user selected time period.

In other features, the list of condensing units is generated based on user inputs using said SOS path. The list of condensing units is generated based on a competitive model number using the CCP path.

In still another feature, the method further includes generating an order based on a redesigned condensing unit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a screen-shot illustrating an order history screen for a first starting path;

FIG. 6 is a screen-shot illustrating a condensing unit performance screen for a condensing unit model selected from the order history screen;

FIG. 8 is a screen-shot illustrating a search screen to determine a standard condensing unit model for a second starting path;

FIG. 9 is a screen-shot illustrating exemplary results for a search using the search screen of FIG. 8;

Figure 16:
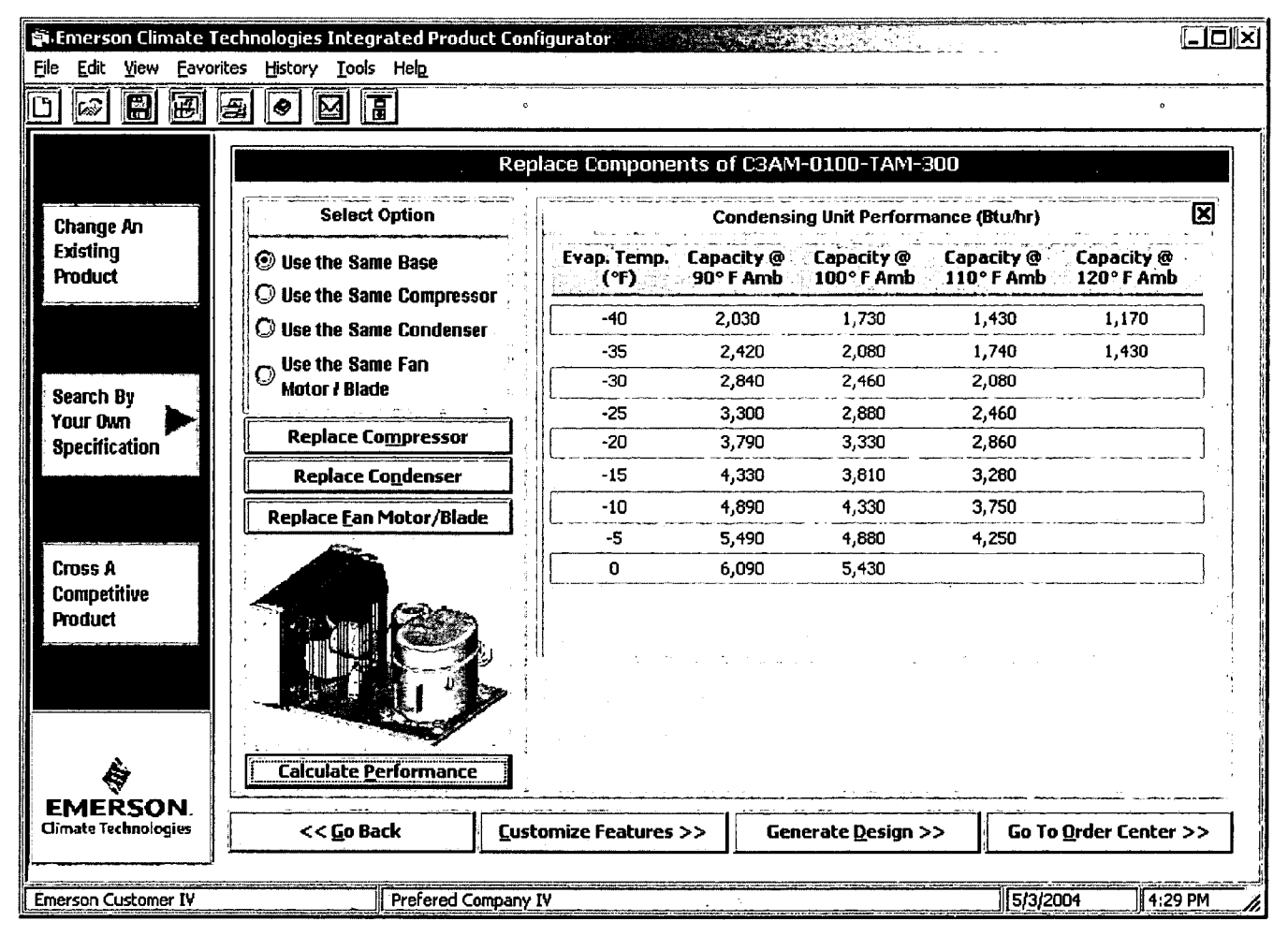

FIG. 16 is a screen-shot illustrating an updated thermal performance for the reconfigured condensing unit model;

Figure 17:
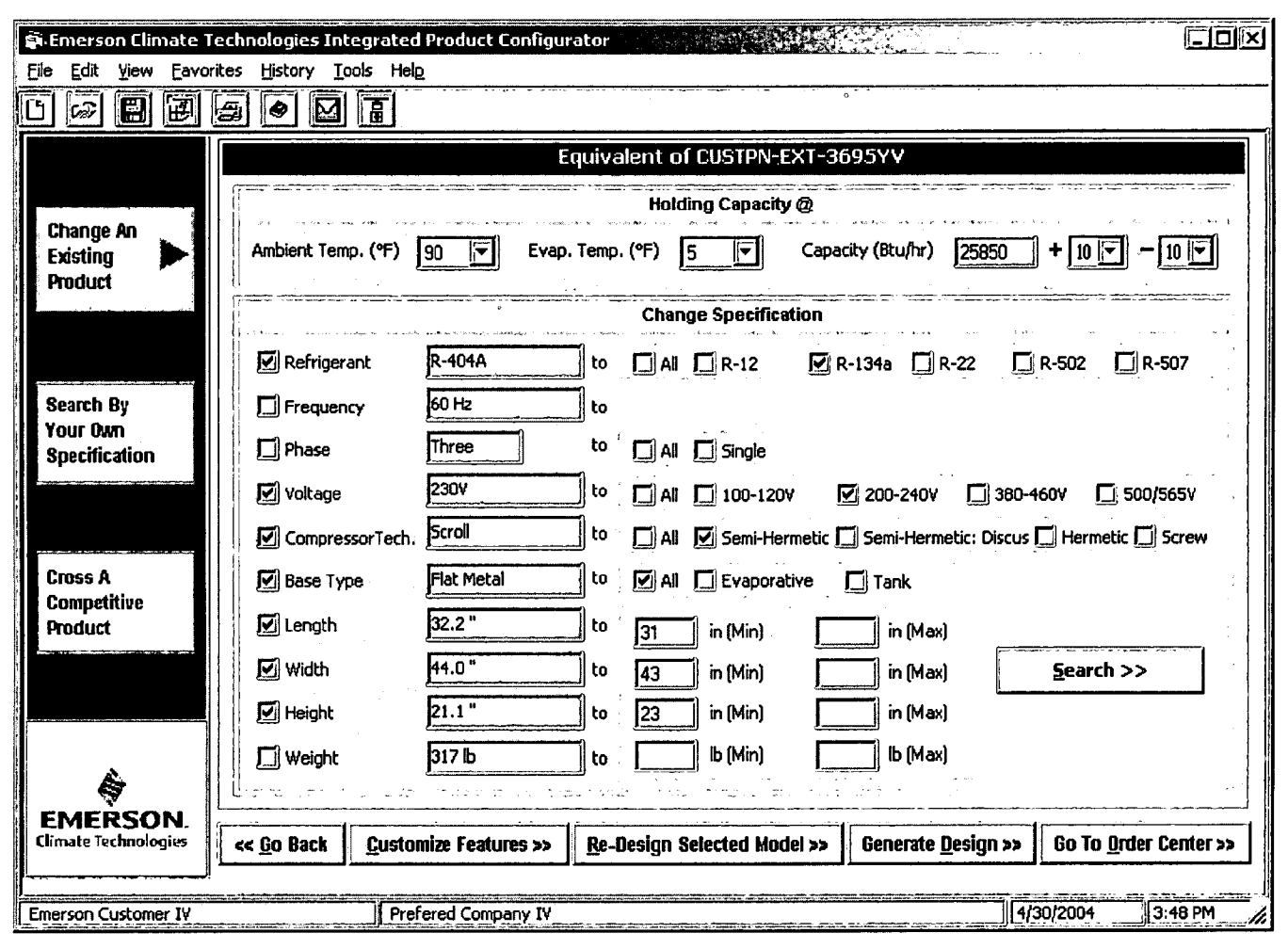

FIG. 17 is a screen-shot illustrating a search screen to determine an equivalent condensing unit model based on user specifications;

Figure 18:
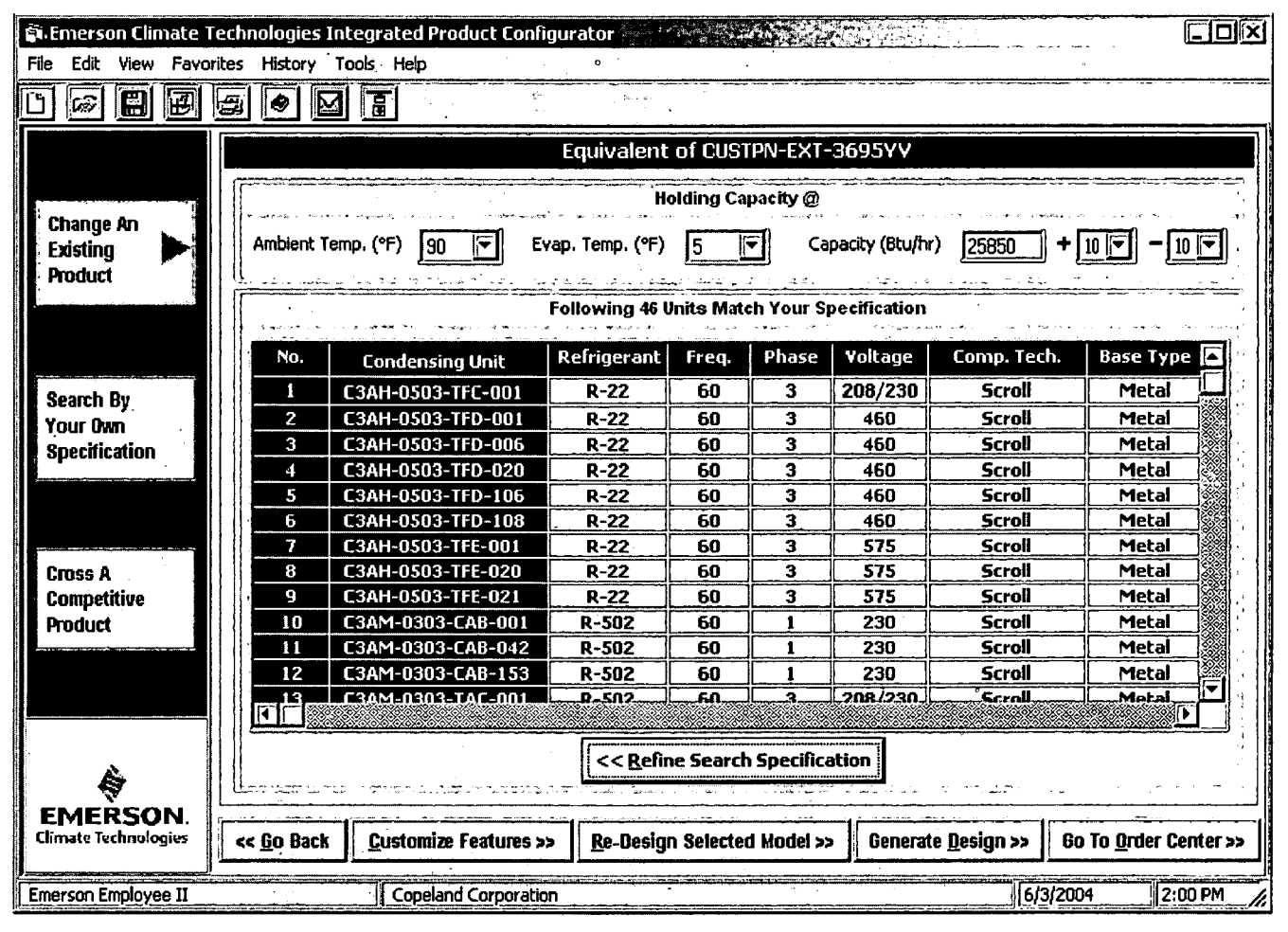

FIG. 18 is a screen-shot illustrating exemplary results of the equivalent condensing unit model search;

DETAILED DESCRIPTION OF THE PREFERRED EMBODIMENTS

The following description of the preferred embodiments is merely exemplary in nature and is in no way intended to limit the invention, its application, or uses.

Figure 1:
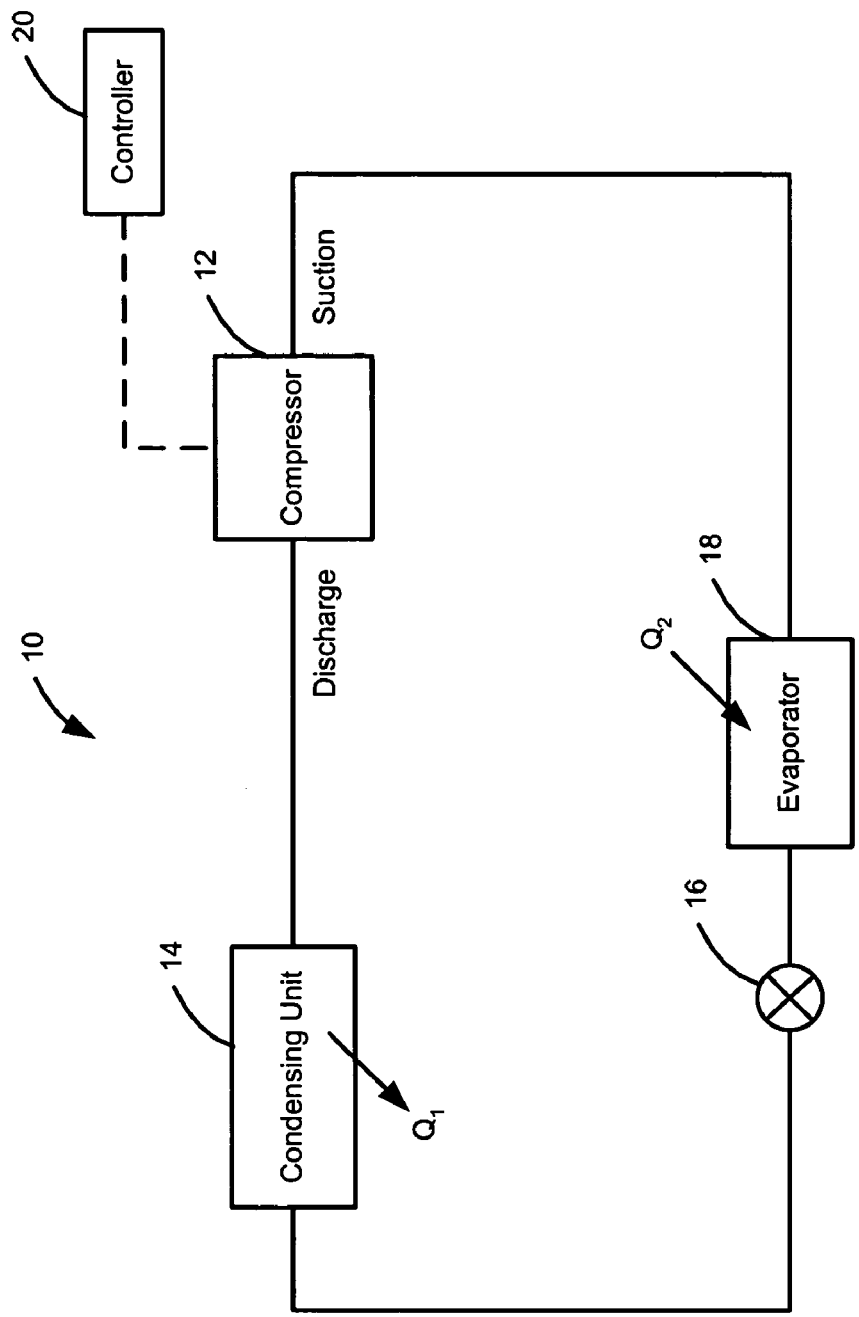
FIG. 1 is a schematic illustration of a generic cooling system incorporating a condensing unit.

Referring now to FIG. 1, a generic cooling system 10 includes a compressor 12, a condensing unit 14, an expansion valve 16 and an evaporator 18. The compressor 12 is controlled by a controller 20 and compresses gaseous refrigerant exiting the evaporator 18. The compressor 12 discharges the high pressure refrigerant to the condensing unit 14. The condensing unit 14 operates as a heat exchanger enabling heat transfer ($Q_1$) from the gaseous refrigerant to a heat sink (e.g., air or water). The refrigerant condenses within the condensing unit 14 and a state change occurs from gas to liquid. The liquid refrigerant exits the condensing unit 14 and flows to the evaporator 18 through the expansion valve 16. The evaporator 18 also operates as a heat exchanger enabling heat transfer ($Q_2$) from the atmosphere surrounding the evaporator 18 to the liquid refrigerant. As the heat transfer occurs, the temperature of the refrigerant increases until a state change occurs from liquid to gas. The gas refrigerant is drawn into the suction side of the compressor 12 and the cooling cycle continues.

Figure 2:
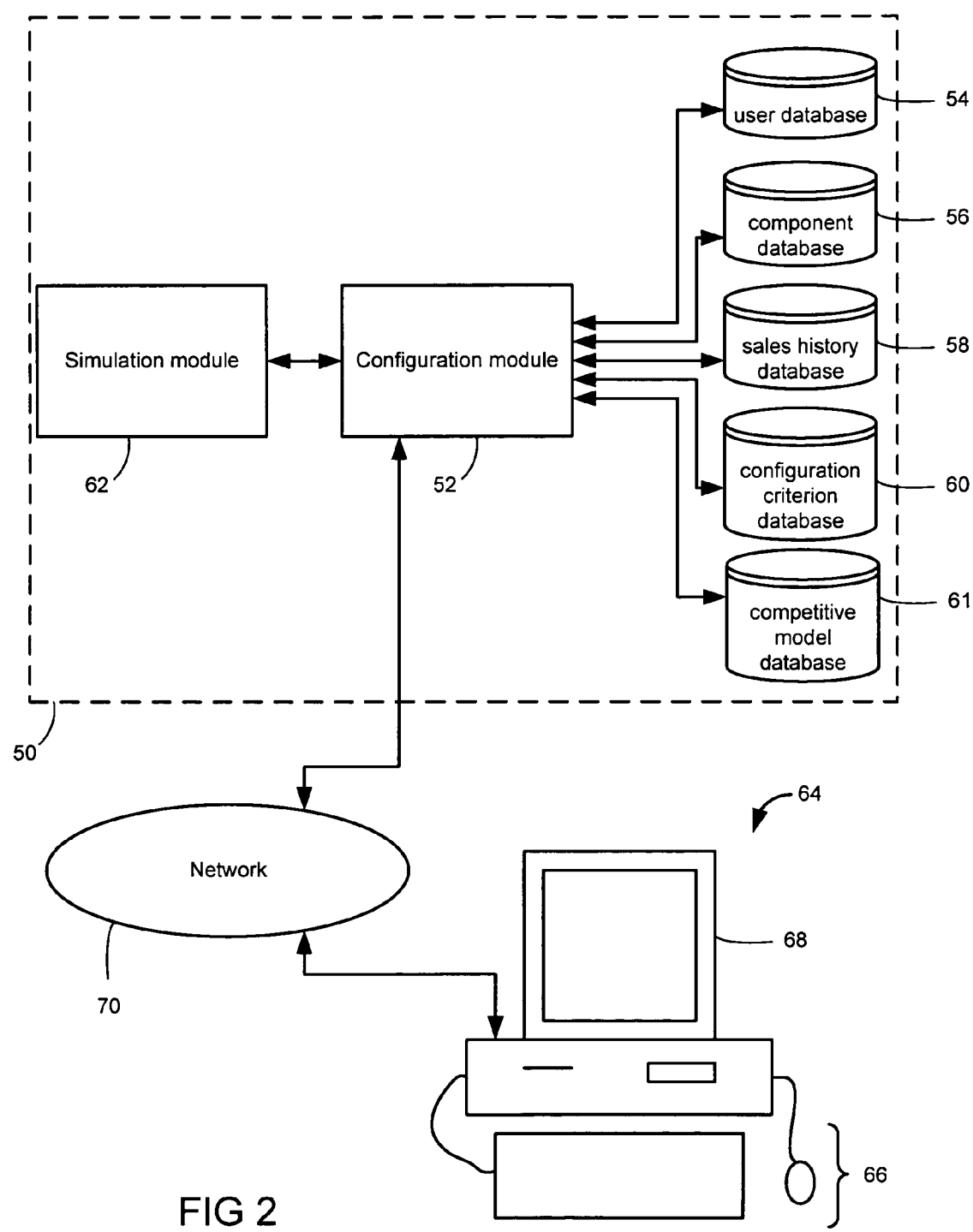
FIG. 2 is a schematic illustration of a condensing unit configurator according to the present invention.

Referring now to FIG. 2, a condensing unit configurator 50 includes a configuration module 52 integrated with several elements including, but not limited to, a user database 54, a component database 56, a sales history database 58, a configuration criterion database 60, a competitive model database 61, and a simulation module 62. As used herein, the term module refers to a software program, or a component of a software program, that is executed by a processor, such as a central processing unit (CPU), with memory. Alternatively, it is understood that a module may also be implemented by an application specific integrated circuit (ASIC), an electronic circuit, a combinational logic circuit, or other suitable implementation means.

Preferably, the condensing unit configurator 50 is provided as a software package executed on a server that enables easy entry of pertinent data, as well as automatic access to the databases containing user, component, sales history, competitive models, and configuration criterion information. As a software package, the condensing unit configurator 50 quickly and seamlessly determines the configuration of a condensing unit and provides comprehensive performance information. More specifically, the condensing unit configurator 50 provides a rule-based algorithm that automates the engineering design and associated processes used to streamline the design process.

The condensing unit configurator 50 is accessible by a user via a client computer 64 with input devices 66, such as a keyboard and mouse, and an output device 68, such as a monitor, connected to a network 70. The network 70 may include the internet, an intranet, an extranet, a local area network, a wide area network, or other suitable communication network for connecting the condensing unit configurator to a client computer.

The user enters login information on the client computer 64 which is communicated to the configuration module 52. The configuration module 52 receives the user login information and accesses user category and user preference information stored in the user database 54. User categories define functions and contents available to a particular user. The configuration module 52 determines the available functions and contents based on the category associated with the user login.

A predefined table of user categories can be readily altered to enable or disable the functions and contents that the particular user can access. For example, high-level users may have access to more functions than a lower-level user. The present exemplary embodiment includes six user categories. Category 1 users can only access standard condensing unit models and limited optional features. The condensing unit configurator functions more as a product selector for category 1 users and re-configuring of the condensing units is not enabled. Category 2 users have the same access as category 1 users plus all units with special optional features. Category 3 users have the same access as the Category 2 users plus the ability to modify optional features.

Category 4 users are able to configure new condensing unit models using the built-in logic and can change the heat transfer components (i.e., compressor, air/water-cooled condenser, fan motor, fan blade). Category 5 is intended for internal customer service and field sales people with the ability to simulate any external customer. This user category has access to the pricing data in addition to the functionality of category 4 users. Category 6 is intended for administrators. Category 6 users have access to all functions available by the condensing unit configurator along with pricing and cost information. It is also anticipated that user categories may be added or deleted as needed.

The condensing unit configurator 50 also enables each user to customize their personal preferences. For example, the user can set preferences of any special features required in the manufacturer's units that they normally purchase (e.g., compressor technology, refrigerant, application, voltages, displaying data in Metric units and the like). Users can change preferences, as their needs change. For example, a user may direct the condensing unit configurator to never show units operating at 460 Volts AC. The selected user preferences remain in-force until the user alters them or resets them to default settings. User preferences are stored in the user database 54.

After login, the user selects a condensing unit. As described in more detail below, the user may select a previously purchased condensing unit. The configuration module 52 accesses sales history information in the sales history database 58. The condensing unit configurator 50 can generate individual sales histories identifying part numbers for a particular user during a particular user defined period. This function is interactive. More specifically, a user can view the condensing unit models purchased during the selected period. If the customer historically purchased refrigerant R-134a high temperature application condensing units but is now assessing a refrigerant R-404A unit suitable for low temperature application, the condensing unit configurator 50 will alert the user.

A condensing unit may also be selected based on user search criteria or based on a competitor condensing unit. The configuration module 52 accesses condensing unit information in the component database 56. Two component categories are used to build valid condensing unit assemblies. First, the major components category is used to build the thermal capacity unit for delivering capacity/efficiency. The parts in the major components category include compressors, refrigerant-to-air heat exchangers, refrigerant-to-water heat exchangers, air moving devices (fan motor and fan blade assemblies) and mounting chassis.

Second, the optional components category includes components that do not impact the thermal performance of the unit but are needed for other functions. The parts in the optional components category include, but are not limited to, controls, pressure vessels, shut-off valves, special fittings, electrical boxes, and safety devices such as contactors, fuses and the like. The optional components are added after the thermal capacity unit has been configured to provide the user specified thermal performance.

A user may select a competitive condensing unit model from the competitive model database 61 which stores competitive condensing unit model information. The configuration module 52 may then find condensing units that are equivalent to the selective competitive condensing unit model.

Once the condensing unit is selected, the configuration module 52 configures components selected by the user based on configuration criterion information in the configuration criterion database 60. The configuration criterion information includes several elements, including, but not limited to, engineering rules, design processes, pricing algorithms, component cost data, model naming conventions, physical and electrical component attributes and relationships, safety agency regulations, and thermodynamic algorithms to generate thermal performance.

The configuration module 52 communicates with a simulation module 62 to obtain performance data for a configured condensing unit. The simulation module 62 performs a simulation of the configured condensing unit, and communicates performance data based on the simulation. The simulation module 62 may be a software implemented simulator of the type disclosed in assignee's commonly-owned U.S. Pat. No. 6,775,995, filed May 13, 2003, or disclosed in U.S. patent application Ser. No. 10/920,140, filed Aug. 17, 2004, which are incorporated herein by reference.

The condensing unit configurator 50 may also include utilities to connect with other external databases via the network 70, or other communication connections. In this way, the condensing unit configurator 50 is able to share information and update the underlying data in the databases 54, 56, 58, 60, and 61 on a periodic basis.

Figure 3:
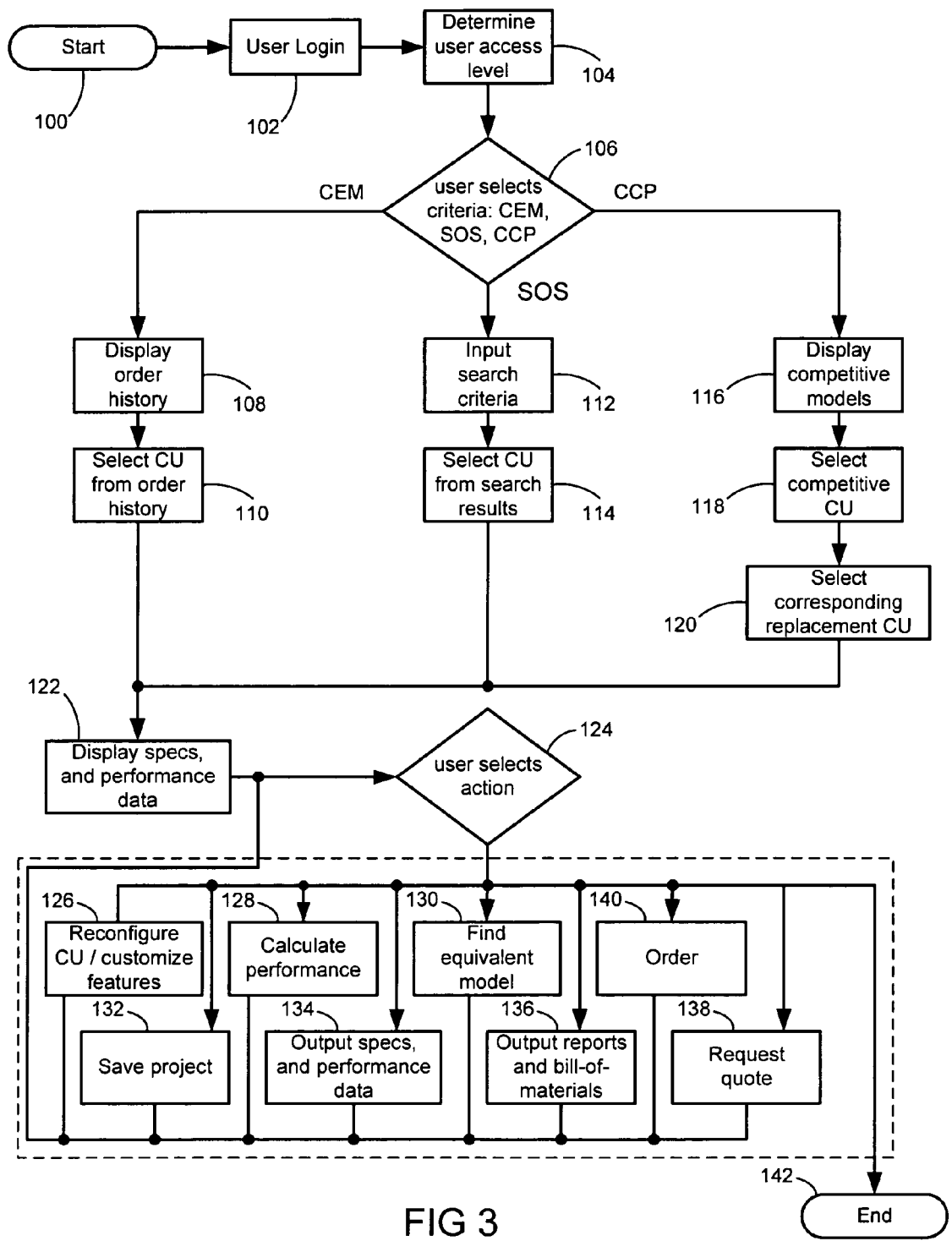
FIG. 3 is a flowchart illustrating steps performed by a condensing unit configurator according to the present invention.
Figure 4:
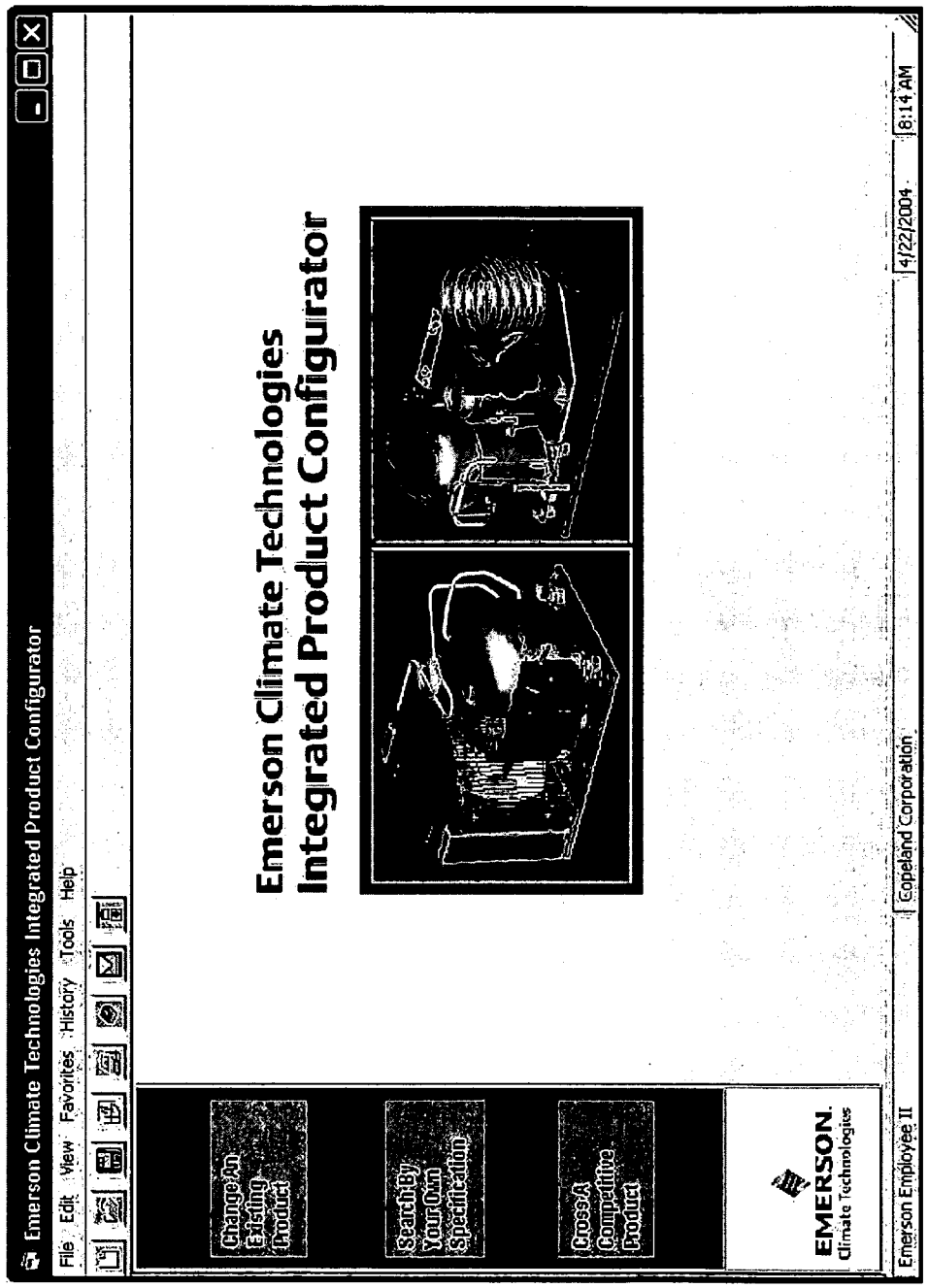
FIG. 4 is screen-shot illustrating starting path selection options of a condensing unit configurator according to the present invention.

Operation of the condensing unit configurator 50 is now described with continued reference to FIG. 2, with reference to FIG. 3, which illustrates steps performed by the condensing unit configurator 50, and with reference to FIGS. 4 through 20, which illustrate screen shots of the condensing unit configurator 50. Operation of the condensing unit configurator 50 begins in step 100. In step 102, a user login is performed. In step 104, a user access category is determined based on the user login. As discussed above, the user login is associated with a user category which defines the functions and contents accessible to the user associated with the login.

In step 106, the user chooses the condensing unit selection criteria. The condensing unit configurator 50 provides a user with three starting paths to initiate the configuration process: change an existing model (CEM), search by your own specification (SOS) and cross a competitive product (CCP). (See FIG. 4). The CEM starting path generates a list of condensing units from the sales history database 58. The SOS starting path generates a list of condensing units from the component database 56. The CCP starting path generates a list of condensing units from the competitive model database 61.

By selecting the CEM path, an order history is displayed in step 108. Specifically, the user is provided with an order history tab, a condensing unit performance tab and a compressor performance tab. (See FIGS. 5 through 7). Regardless of which tab the user has selected, buttons are included that enable the user to customize features, reconfigure the selected model, find an equivalent model and go to an order center. Each of these options is discussed in further detail below.

Figure 5:
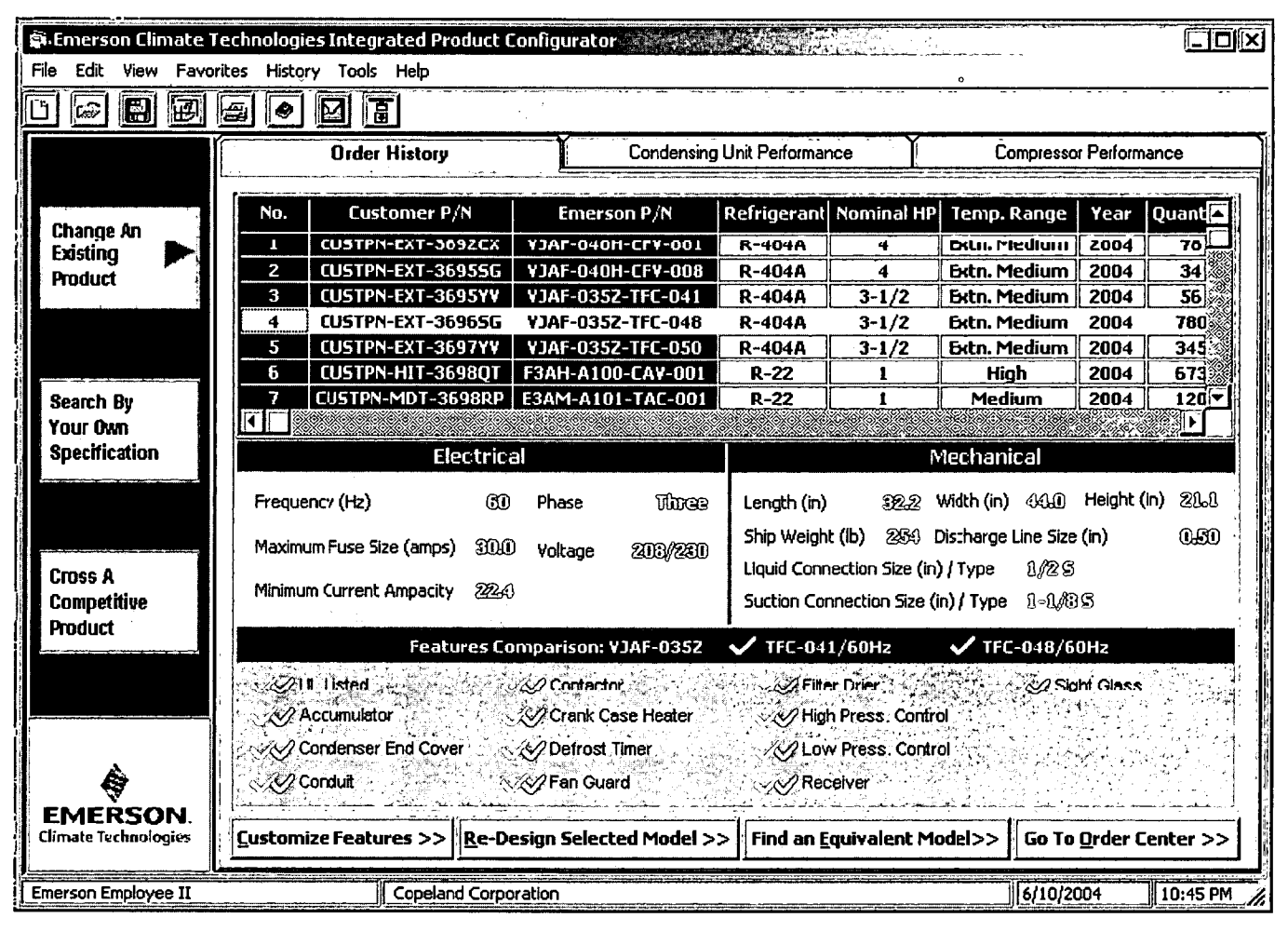

The order history tab displays the user's condensing unit sales history (e.g., over 1 year period). (FIG. 5). The order history can include information including, but not limited to, customer part number (P/N), manufacturer P/N, refrigerant type, nominal horsepower (HP), temperature range, year purchased, quantity purchased, unit cost and the like. The information displayed depends on the user category. In step 110, the user selects a condensing unit from the displayed list of historical purchases.

Figure 8:
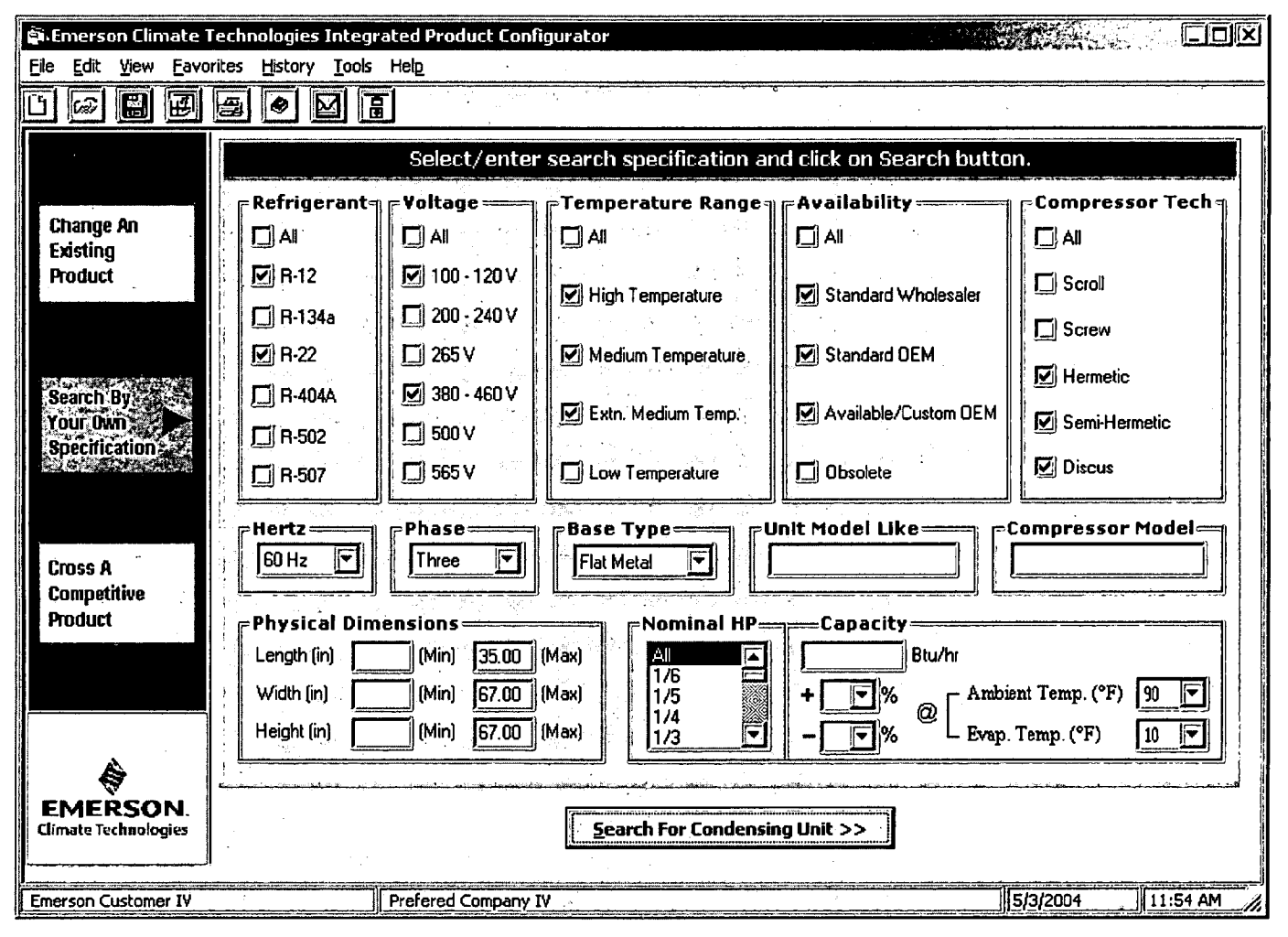

In step 106, by selecting the SOS path, the user can search for condensing unit models by entering search criteria (see FIGS. 8 and 9). Various search parameters are provided and include, but are not limited to, capacity, physical dimensions, refrigerant type, compressor technology, electrical parameters, temperature range, availability and the like. The user inputs the desired search criteria in step 112. For example, some users may select condensing units based on refrigerant and/or capacity whereas others users may seek a condensing unit that fits a certain physical footprint.

Once the search is performed, the condensing unit configurator provides a search results tab, a condensing unit performance tab and a compressor performance tab (see FIG. 9). The search results tab provides a list of the various condensing unit models found based on the search criteria. The user selects a condensing unit from the search results in step 114.

Figure 10:
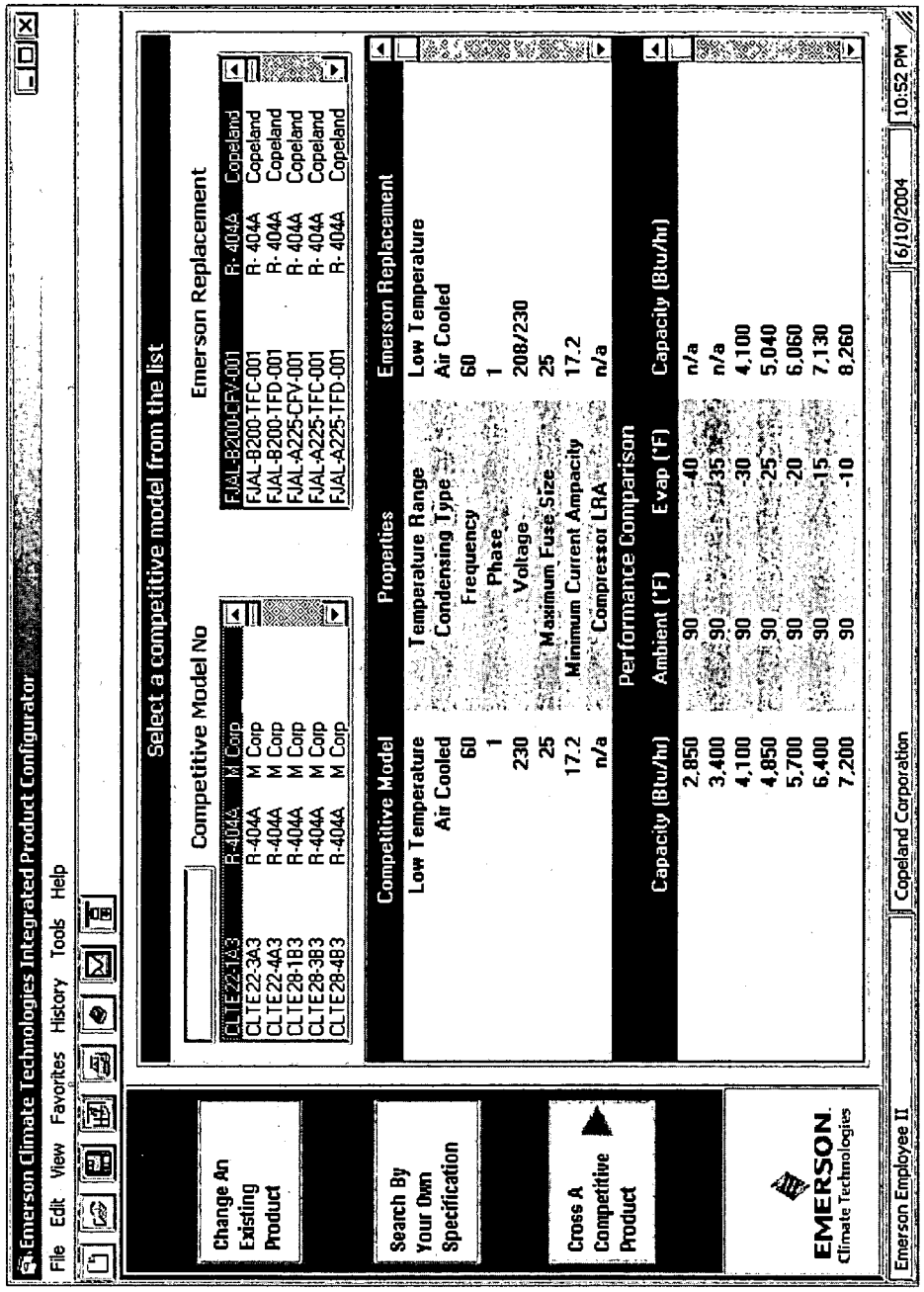
FIG. 10 is a screen-shot illustrating a search screen to determine an equivalent condensing unit to a competitive condensing unit for a third starting path.
Figure 11:
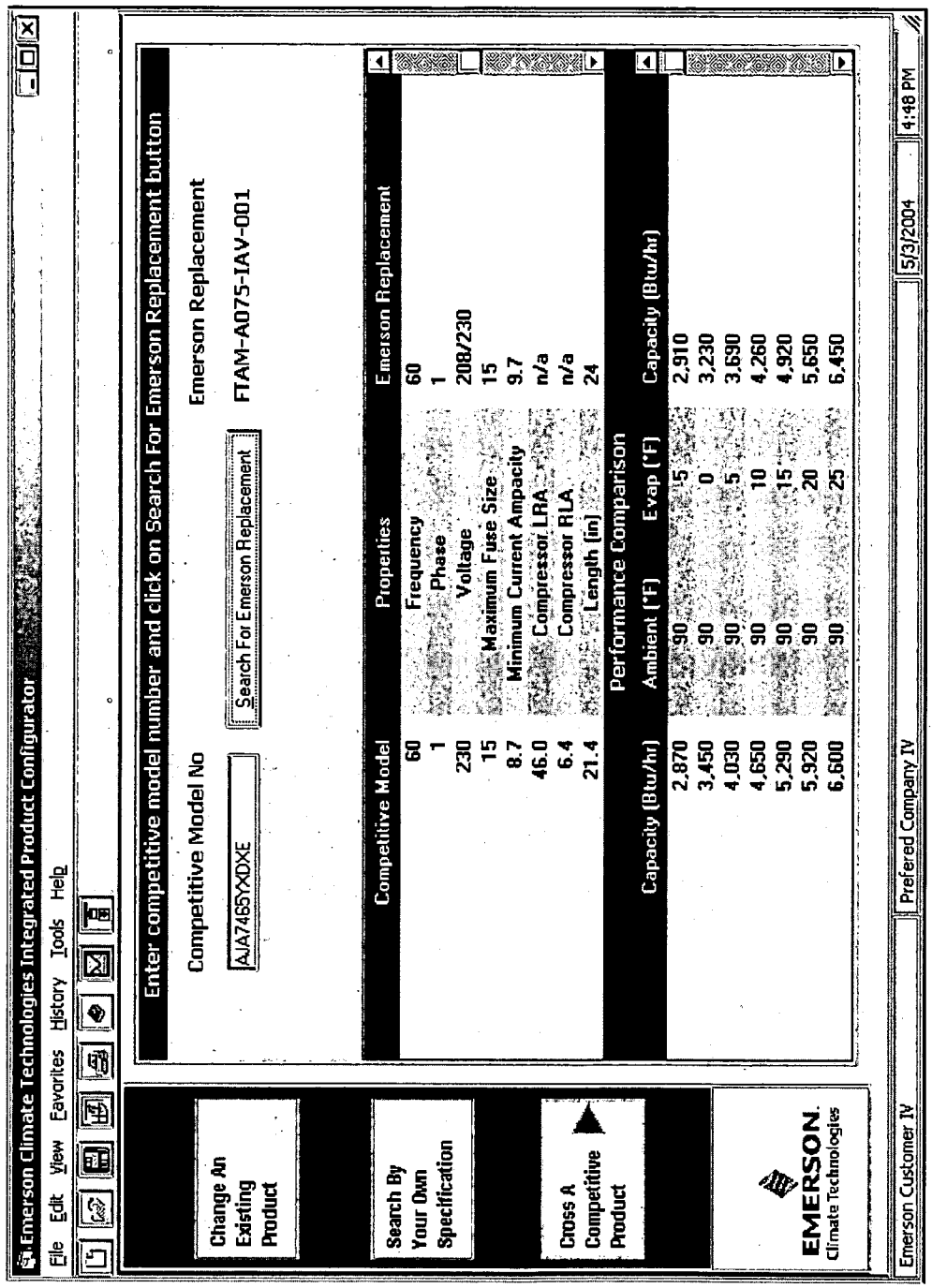
FIG. 11 is a screen-shot illustrating an alternative search screen to determine an equivalent condensing unit to a competitive condensing unit for the third starting path.
Figure 12:
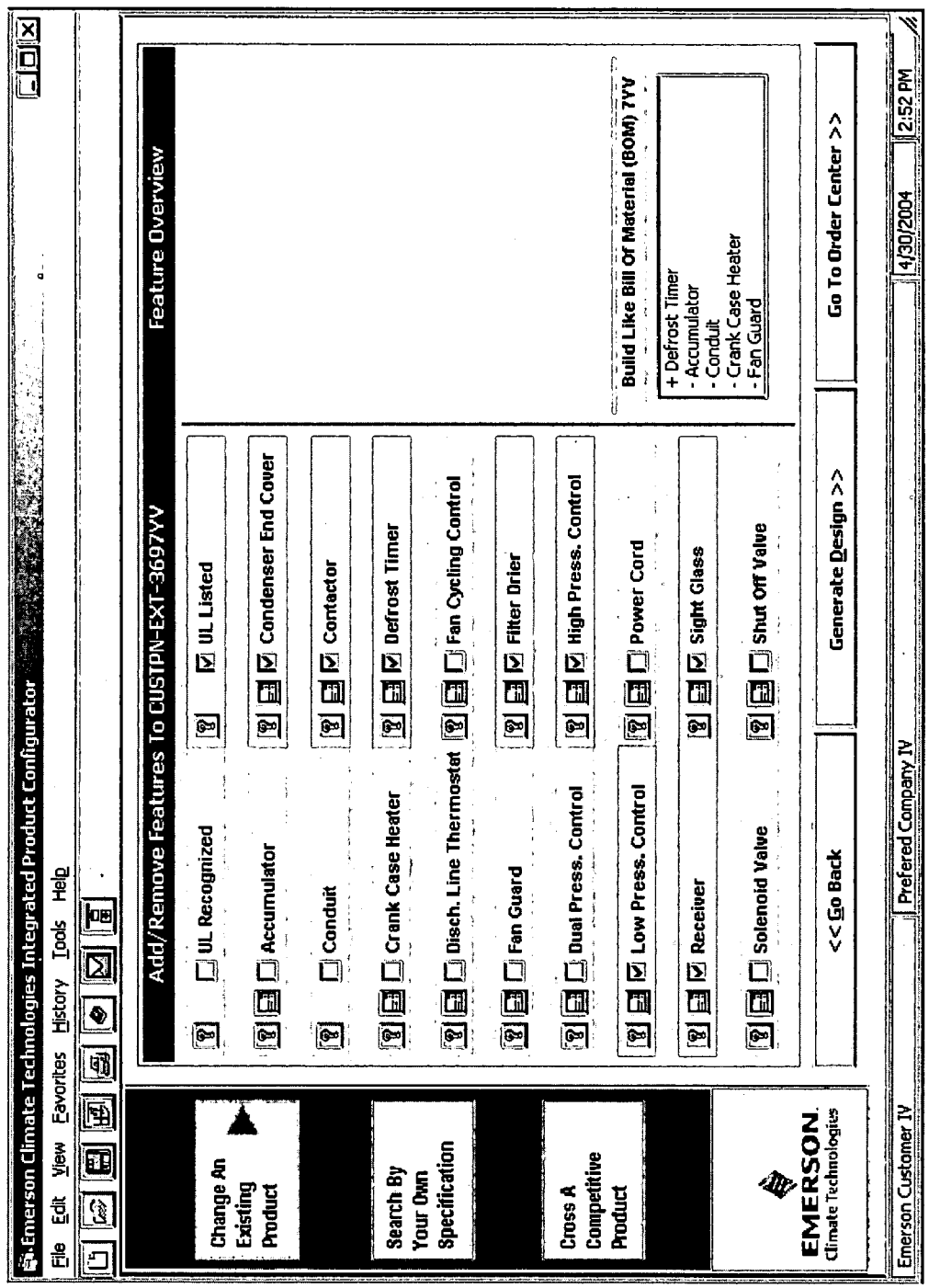
FIG. 12 is a screen-shot illustrating customized features for reconfiguring the selected condensing unit model.
Figure 13:
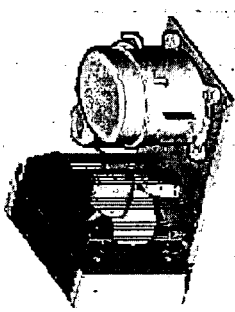
FIG. 13 is a screen-shot illustrating a replace compressor screen for reconfiguring the selected condensing unit model.
Figure 14:
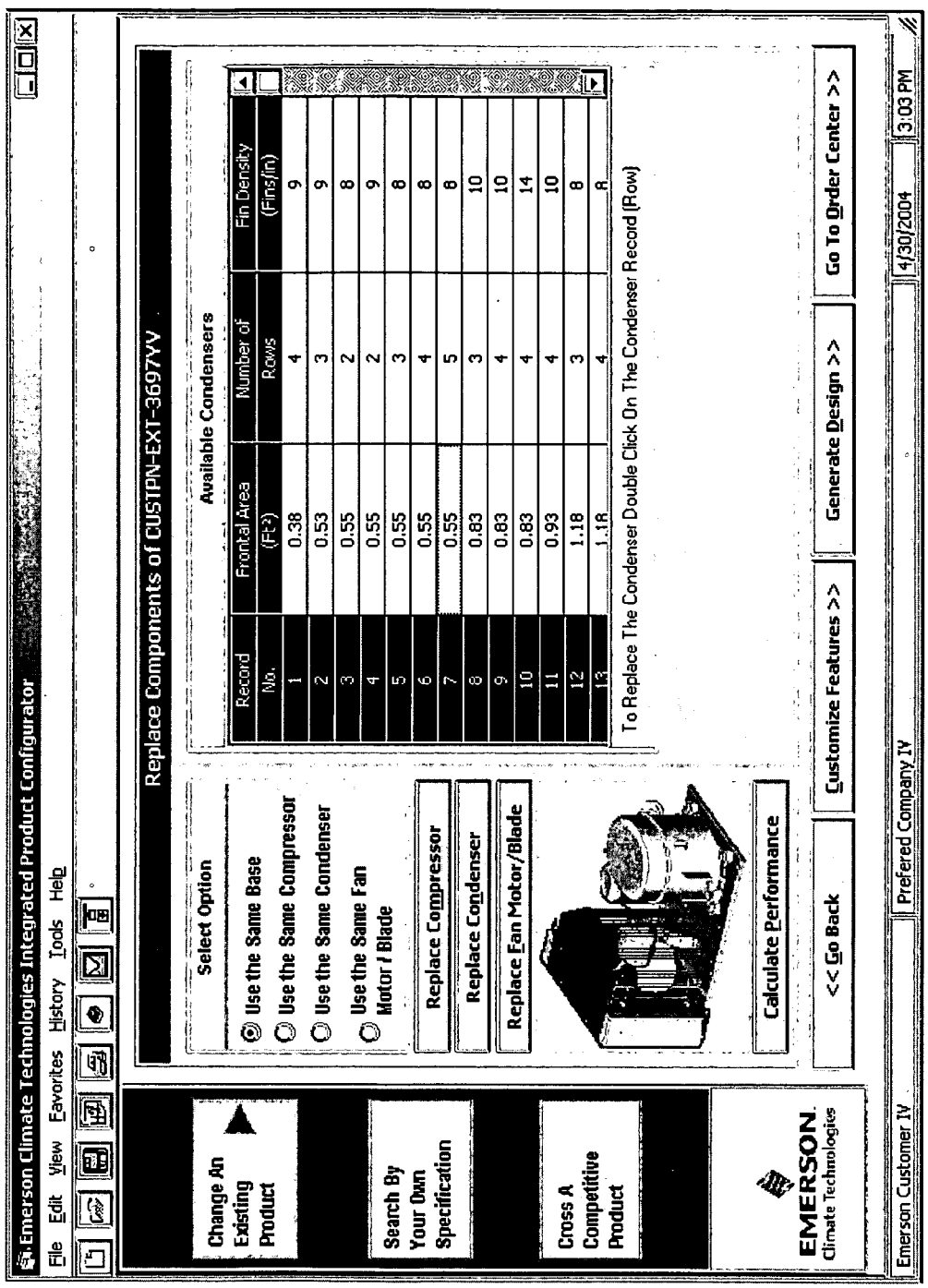
FIG. 14 is a screen-shot illustrating a replace condenser screen for reconfiguring the selected condensing unit model.
Figure 15:
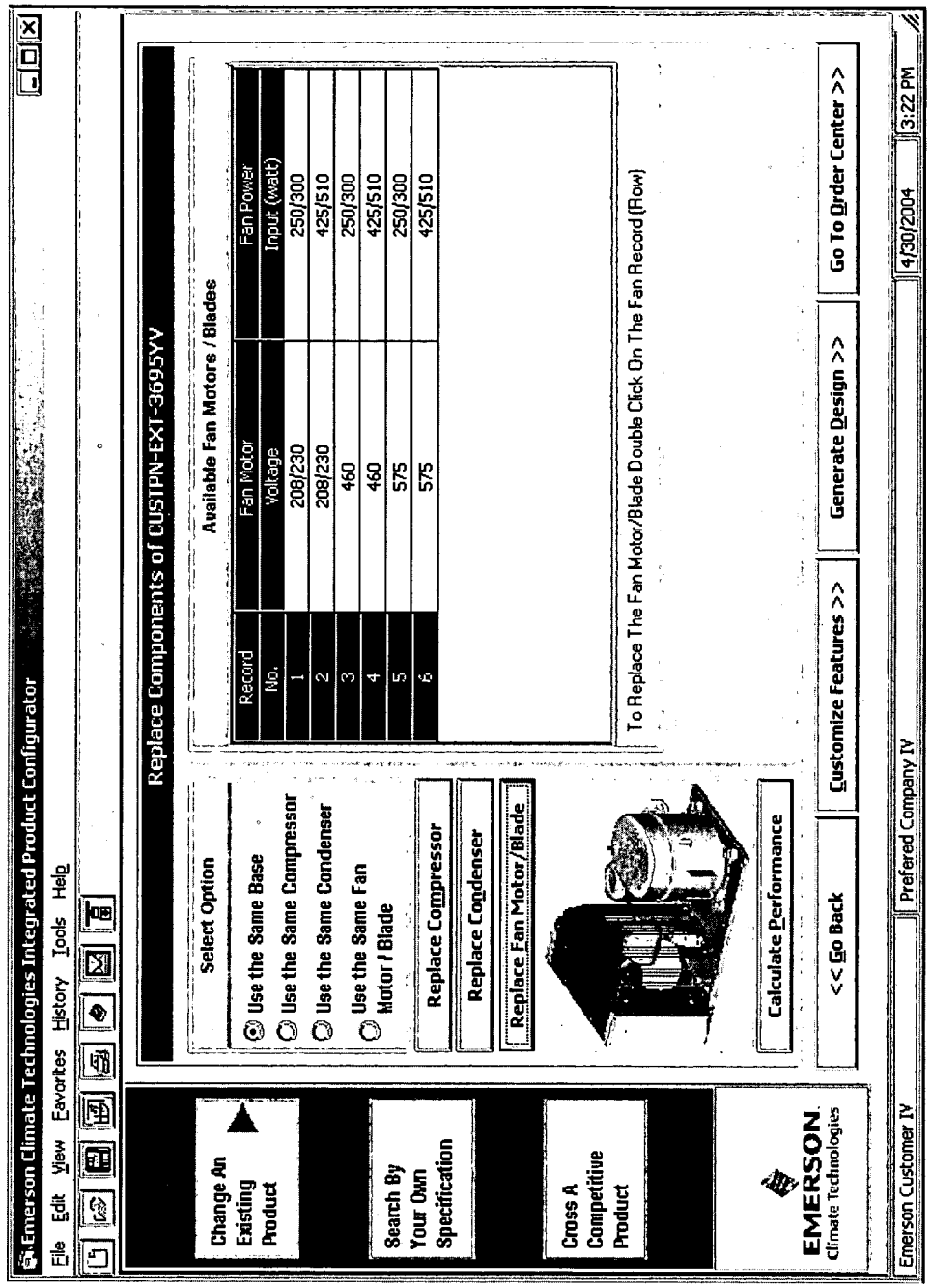
FIG. 15 is a screen-shot illustrating a replace fan motor/blade screen for reconfiguring the selected condensing unit model.

In step 106, by selecting CCP, the user can cross competitive models by selecting a competitive model from a list of competitive model numbers (See FIGS. 10 and 11). A list of competitive condensing unit models is displayed in step 116. (FIG. 10). The competitive model numbers correspond to a list of manufacturer model numbers. After having selected a competitive model number from the list, property and performance comparison tables are updated. The property table compares properties including, but not limited to, temperature range, condensing type, electrical characteristics and the like. The performance comparison table compares capacities (Btu/Hr) for incremental ambient and evaporating temperatures. It is also anticipated that the manufacturers model that corresponds to the competitive model can be determined by a search that is based on the competitive model number (FIG. 11). More specifically, the user inputs a known competitive model number and clicks the search button to find a corresponding manufacturer's model number.

In step 118, a competitive condensing unit is selected from the list of competitive model numbers or from the competitive model search results. In step 120 a condensing unit replacement which corresponds to the competitive model is selected (FIGS. 10 and 11).

In step 122, upon selecting a condensing unit model, specifications and performance data are displayed corresponding to that model. The specifications include, but are not limited to, thermal performance, electrical and mechanical information such as physical dimensions, connection sizes and optional features such as pressure controls, shut-off valves, enclosures and the like. The features can be compared between two condensing units, with check marks indicating which features a particular unit includes. (See FIG. 5).

Figure 6:
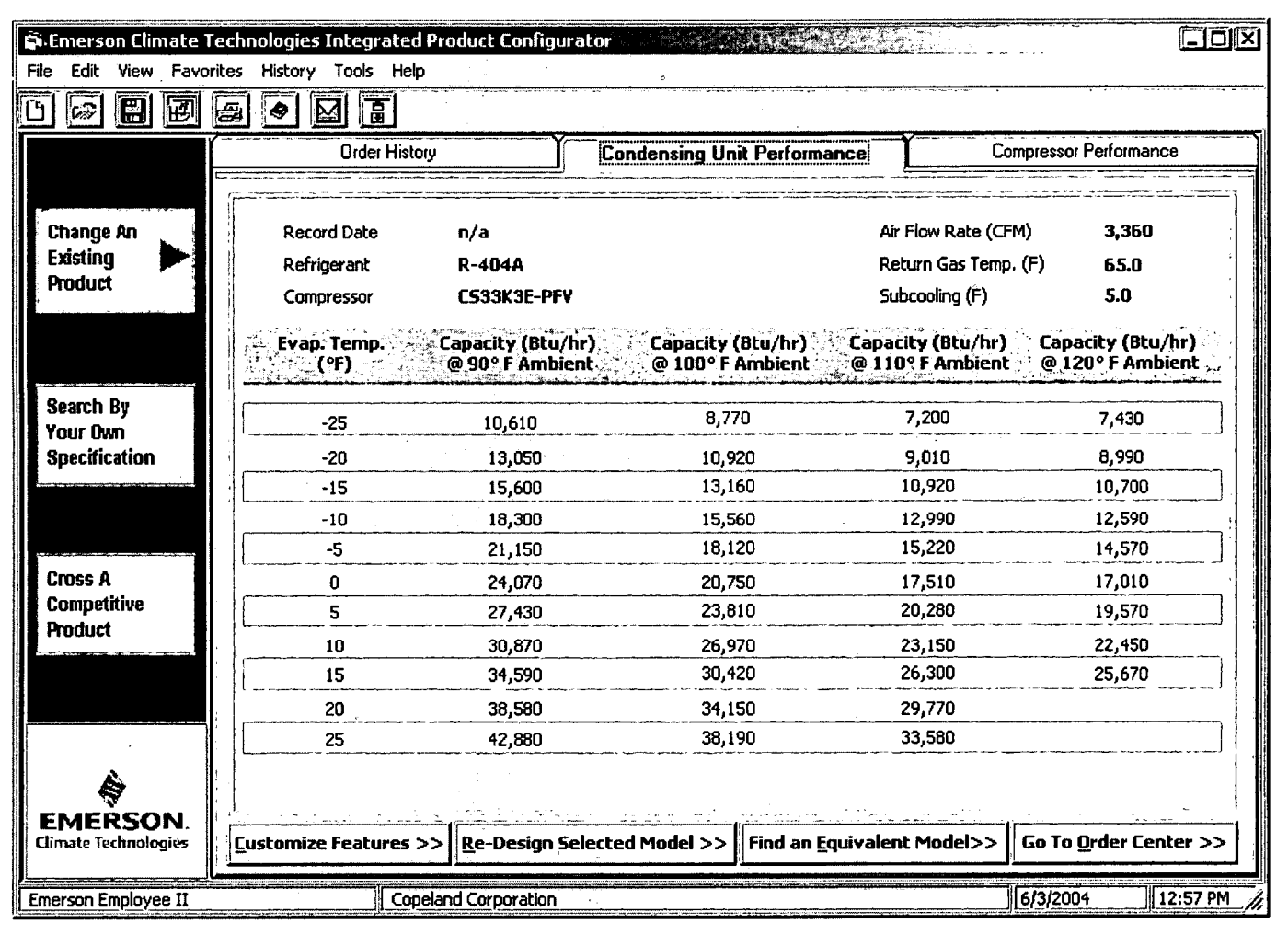

By clicking on the condensing unit performance tab, the calculated thermal performance data is provided for the selected condensing unit model (see FIG. 6). The performance data is summarized in tabular form and includes capacities (Btu/Hr) for incremental ambient temperatures (e.g., 90° F., 100° F., 110° F. and 120° F.) that correspond to incremental evaporating temperatures (° F.). The performance data is determined based on an air flow rate, a return gas temperature, a sub-cooling temperature, compressor model and refrigerant type.

Figure 7:
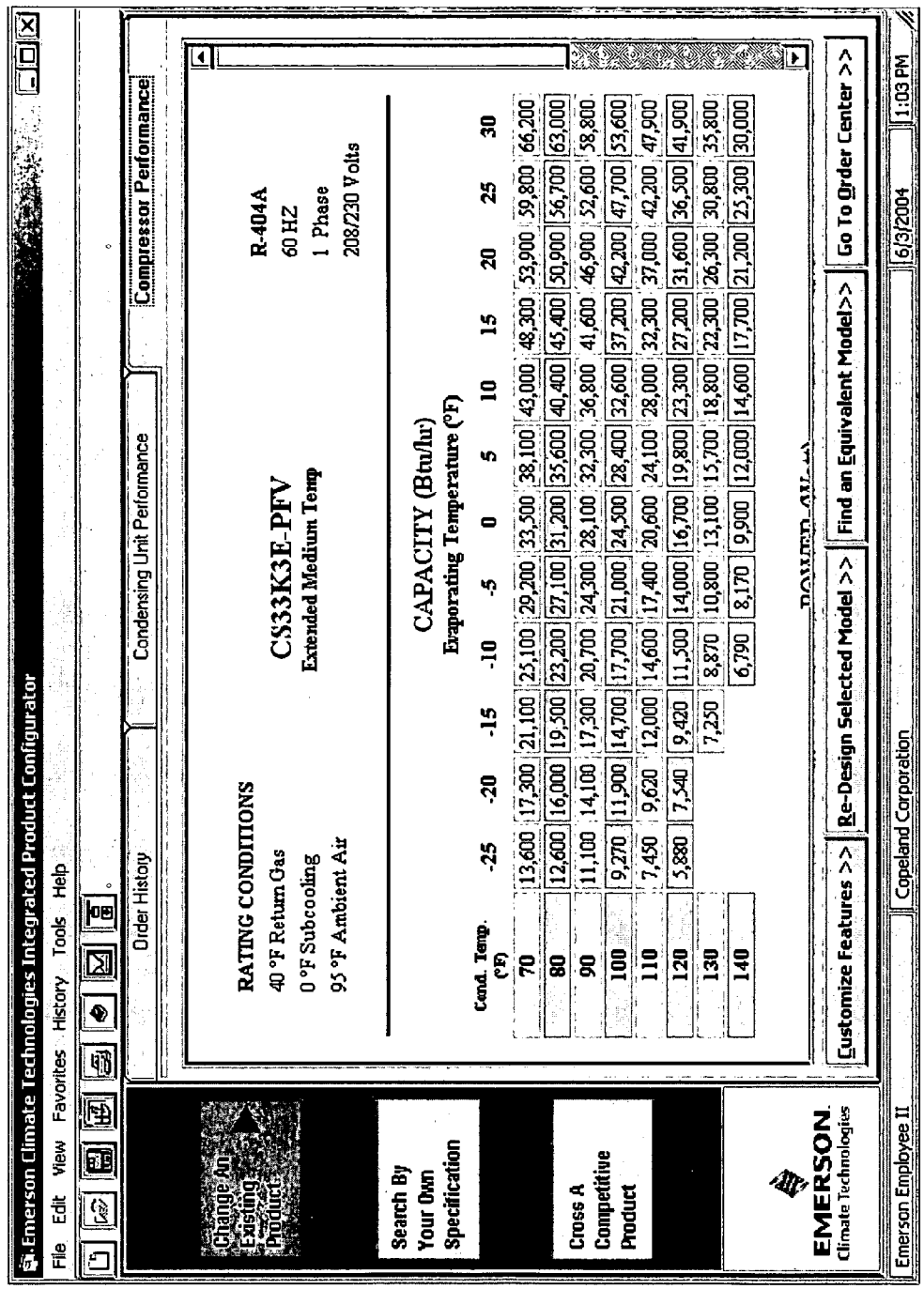
FIG. 7 is a screen-shot illustrating a compressor performance of the condensing unit model selected from the order history screen.

By clicking on the compressor performance tab, performance data is provided for the compressor associated with the condensing unit (see FIG. 7). The performance data includes both capacity (Btu/Hr) and power (W) with each summarized in tabular form based on incremental evaporating temperatures (° F.) and incremental condensing temperatures (° F.). The performance data is determined based on return gas temperature, sub-cooling temperature, ambient temperature, refrigerant type and electrical characteristics.

In step 124, the user may perform a number of actions, depending on the user category. The user may customize features or reconfigure the condensing unit in step 126. By clicking on the customize features button, the user may have the ability (i.e., depending on user category) to custom select the optional features provided with the selected condensing unit (see FIG. 12). A table of features is provided. Features that are not valid for the selected condensing unit are shaded and not selectable. The user selects desired features by checking the box associated with the feature. Informational buttons are also provided for each feature. By clicking on one of the informational buttons, further information is provided for the particular feature including an illustration, a brief summary and performance information. Once the user determines the optional features to include, the user can click on a generate design button or a go to order center button, which are described in further detail below.

By clicking on the re-design selected model button, the user may have the ability (i.e., depending on user category) to re-configure the condensing unit by changing the major heat transfer components such as compressor, air-cooled or water cooled condenser, fan blade, etc. or may change the optional features (e.g., pressure controls, fan guard, condenser end covers, etc.) (See FIGS. 13 through 15). More specifically, the user can use the same base and replace the compressor, condenser and/or fan motor/blade. The user can use the same compressor and replace the base, condenser and/or fan motor/blade. Alternatively, the user can use the same condenser and replace the base, compressor and/or fan motor/blade. As a further option, the user can use the same fan motor/blade and replace the base, condenser and/or compressor. The user selects the button corresponding to the component to be replaced (e.g., base, compressor, condenser and/or fan motor/blade). A table of available components is provided and the user selects the desired component from the table. The table includes information associated with the particular component. The user can also customize features by selecting the customize features button and generate the design be selecting the generate design button.

Once the user has re-configured the condensing unit in step 126, the user may select another action in step 124. The user may choose to calculate the performance of the re-configured condensing unit in step 128. (See FIG. 16). The performance of the re-configured condensing unit can be calculated by selecting the calculate performance button. A range of condensing unit capacities (Btu/Hr) are provided in tabular form based on incremental evaporating temperatures and incremental ambient temperatures.

The user may find an equivalent model in step 130. (See FIGS. 17 and 18). By clicking on the find an equivalent model button, the user may have the ability (i.e., depending on user category) to search for a condensing unit that has a specification similar to the selected condensing unit. More specifically, holding capacity information and specifications for the selected condensing unit model are provided. The user can change the holding capacity information and the specifications. The condensing unit configurator searches for an equivalent model when the search button is selected. The condensing unit configurator provides a table of alternative condensing units that match the specification criteria (see FIG. 18). The table provides basic information for each of the alternative condensing units including, but not limited to, P/N, refrigerant type, electrical information, compressor technology (e.g., scroll), base type and the like.

Once the condensing unit has been configured, the condensing unit configurator 50 enables the user to save the project in step 132, and obtain a hard copy of the thermal, mechanical and electrical specifications of the condensing unit, a report, a bill-of-materials and the like in steps 134 and 136. In step 138 the user may indicate whether a formal quote is needed from the manufacturer based on the user's condensing unit configuration, or whether a condensing unit sample is needed. In step 140, a link is provided to the customer portal if the user is interested in placing an order.

Figure 19:
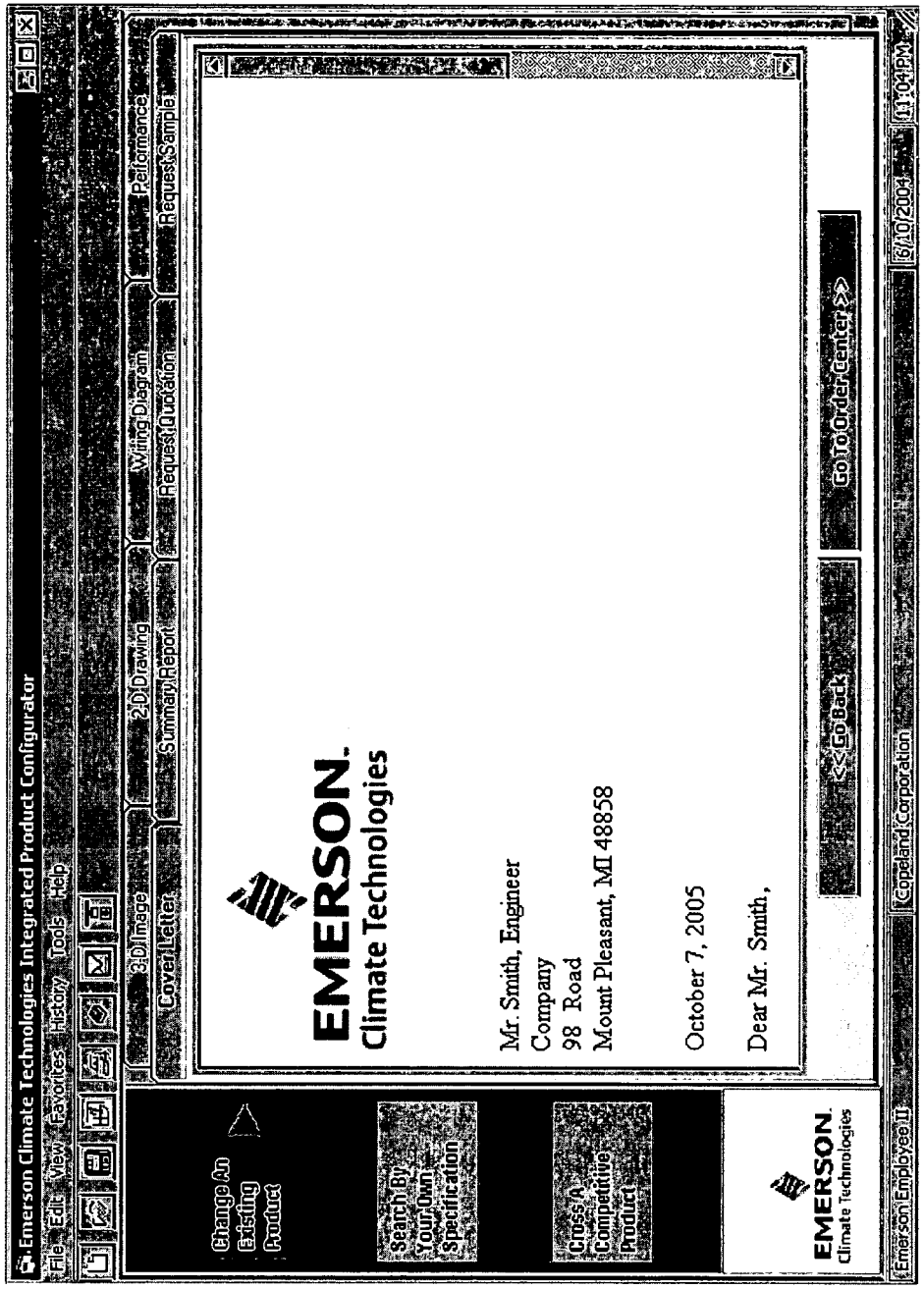
FIG. 19 is a screen-shot illustrating reporting options regarding the selected condensing unit.
Figure 20:
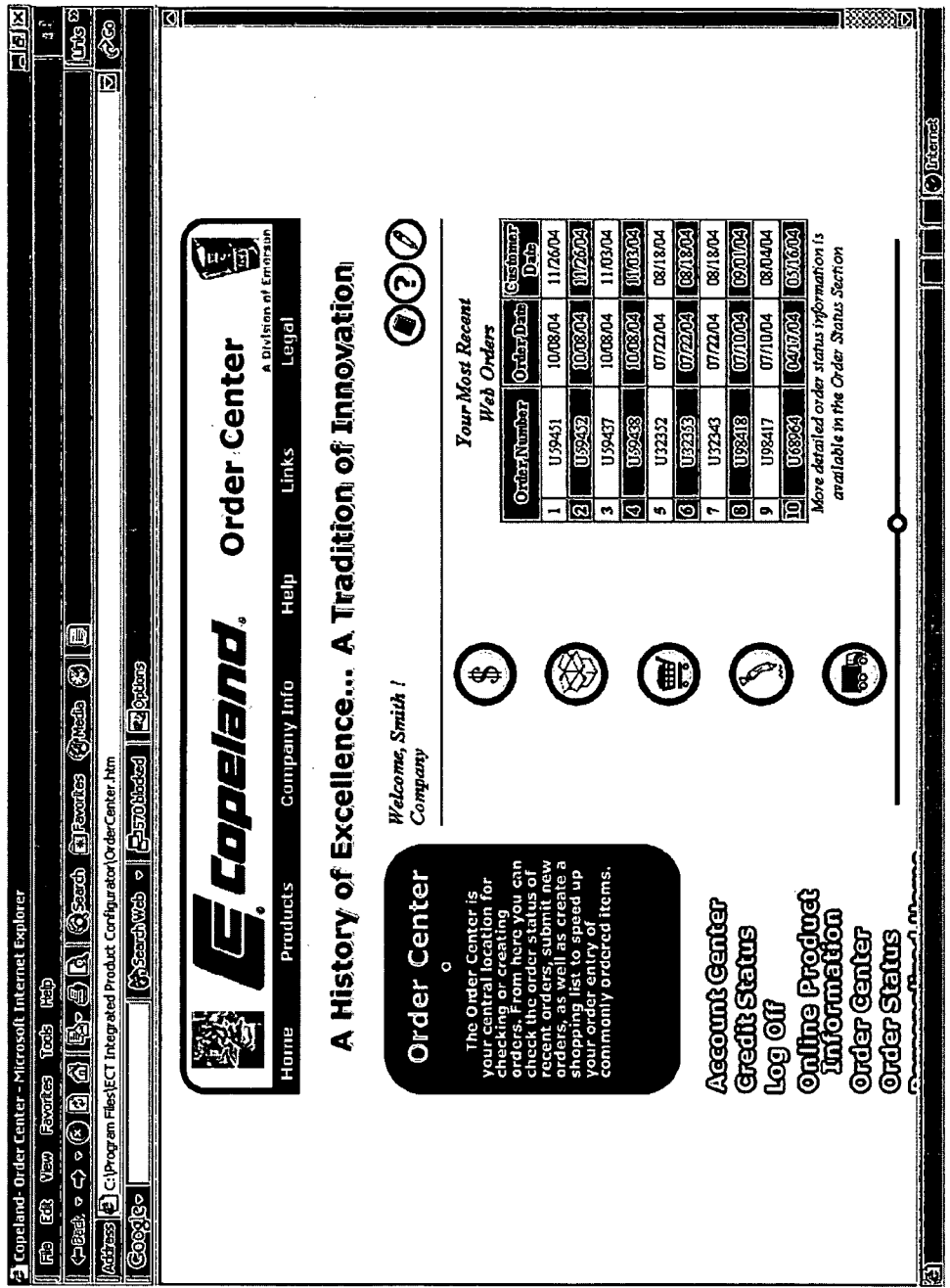
FIG. 20 is a screen-shot illustrating an order center of the condensing unit configurator.

The condensing unit configurator assigns a project number for user's configuration for tracking purposes. This number can be a combination of a customer number, user ID and a configuration number. Select information can be emailed to the manufacturer's field sales engineer or the manufacturer's office. A report function is available when the user chooses the generate design button and order placement is achieved by choosing the go to order center button. FIG. 19 illustrates the reports and functions available. FIG. 20 illustrates the order center options available when placing an order. The condensing unit configurator 50 ends in step 142.

The condensing unit configurator 50 of the present invention is preferably implemented as a user-friendly, software-based program that can be used by a variety of users with little technical training and minimal product knowledge. A user can customize preferences in the software so that only user specific features are displayed. Customer specific product sales histories based for a selected period are displayed and a cross-reference is provided between the manufacturer and competitive condensing unit models.

The condensing unit configurator 50 rapidly generates valid condensing units based on engineering rules and design practices to provide consistent designs. A customer quote package is generated and includes: standard off-the-shelf products along with custom design solutions, reference drawing showing layout of the key components and physical dimensions, thermal performance information, a bill-of-material, electrical specifications, pricing/delivery information, a cover letter and special requirements such as product samples, shipping instructions and the like. Further, various functions are provided to the user via pre-defined user categories that can be readily changed to minimizing coding requirements.

The condensing unit configurator 50 can be linked with other corporate software and databases to generate condensing unit performance, accessing a customer portal and generating compressor performance. Run procedures automatically synchronize the databases and the condensing unit configurator 50 on users' client computer 64 to ensure users are using the most current version of the application/databases. The condensing unit configurator 50 also enables a user to search standard off-the-shelf condensing unit models along with the optional components that are the closest match to the newly configured condensing unit.

The description of the invention is merely exemplary in nature and, thus, variations that do not depart from the gist of the invention are intended to be within the scope of the invention. For example, the particular order of functions and actions described herein is merely exemplary. It is understood that the sequence of functions and actions may be varied to accomplish the functionality described herein. Such variations are not to be regarded as a departure from the spirit and scope of the invention.

What is claimed is:

1. A method of computer-based configuration of a condensing unit for a cooling system, comprising:
   selecting a starting path from a plurality of starting paths including an existing product path, a search by specification path, and a cross competitive product path;
   generating a list of condensing units based on said selected starting path;
   selecting a condensing unit from said list of condensing units; and
   re-configuring said condensing unit based on desired criteria.

2. The method of claim 1 further comprising:
   inputting a user identity; and
   limiting available options along each of said plurality of starting paths based on said user identity.

3. The method of claim 1 wherein said list of condensing units is generated based on a history of purchased condensing units.

4. The method of claim 3 wherein said history is defined over a user selected time period.

5. The method of claim 1 wherein said list of condensing units is generated based on user inputs.

6. The method of claim 1 wherein said list of condensing units is generated based on a competitive model number.

7. The method of claim 1 further comprising generating an order based on a redesigned condensing unit.

8. The method of claim 1 wherein when said existing product path is selected as said starting path, said list of condensing units is generated based on a history of purchased condensing units.

9. The method of claim 8 further comprising displaying said history of purchased condensing units, including at least one of a customer part number, a manufacturer part number, a refrigerant type, a nominal horsepower, a temperature range, a date purchased, a quantity purchased, and a unit cost.

10. The method of claim 1 further comprising receiving at least one search parameter, wherein when said search by specification path is selected as said starting path, said list of condensing units is generated based on said at least one received search parameter.

11. The method of claim 10 wherein said at least one received search parameter includes at least one of a capacity, a physical dimension, a refrigerant type, a compressor technology type, an electrical parameter, a temperature range, and an availability.

12. The method of claim 1 wherein when said cross competitive product path is selected as said starting path, said list of condensing units is generated to include at least one competitive condensing unit product.

13. The method of claim 12 further comprising displaying at least one model number corresponding to said at least one competitive condensing unit product.

14. The method of claim 1 further comprising generating thermal performance data for said condensing unit.

15. A method of computer-based configuration of a condensing unit for a cooling system, comprising:
    selecting a starting path from a plurality of starting paths including an existing product path, a search by specification path, and a cross competitive product path;
    limiting available options along each of said plurality of starting paths based on a user login;
    generating a list of condensing units based on said selected starting path;
    selecting a condensing unit from said list of condensing units;
    re-configuring said condensing unit based on desired criteria; and
    generating an order based on a redesigned condensing unit.

16. The method of claim 15 further comprising inputting said user login.

17. The method of claim 15 wherein said list of condensing units is generated based on a history of purchased condensing units.

18. The method of claim 17 wherein said history is defined over a user selected time period.

19. The method of claim 15 wherein said list of condensing units is generated based on user inputs.

20. The method of claim 15 wherein said list of condensing units is generated based on a competitive model number.

21. The method of claim 15 wherein when said existing product path is selected as said starting path, said list of condensing units is generated based on a history of purchased condensing units.

22. The method of claim 21 further comprising displaying said history of purchased condensing units, including at least one of a customer part number, a manufacturer part number, a refrigerant type, a nominal horsepower, a temperature range, a date purchased, a quantity purchased, and a unit cost.

23. The method of claim 15 further comprising receiving at least one search parameter, wherein when said search by specification path is selected as said starting path, said list of condensing units is generated based on said at least one received search parameter.

24. The method of claim 23 wherein said at least one received search parameter includes at least one of a capacity, a physical dimension, a refrigerant type, a compressor technology type, an electrical parameter, a temperature range, and an availability.

25. The method of claim 15 wherein when said cross competitive product path is selected as said starting path, said list of condensing units is generated to include at least one competitive condensing unit product.

26. The method of claim 25 further comprising displaying at least one model number corresponding to said at least one competitive condensing unit product.

27. The method of claim 15 further comprising generating thermal performance data for said condensing unit.

* * * * *